Figures 1, 2:
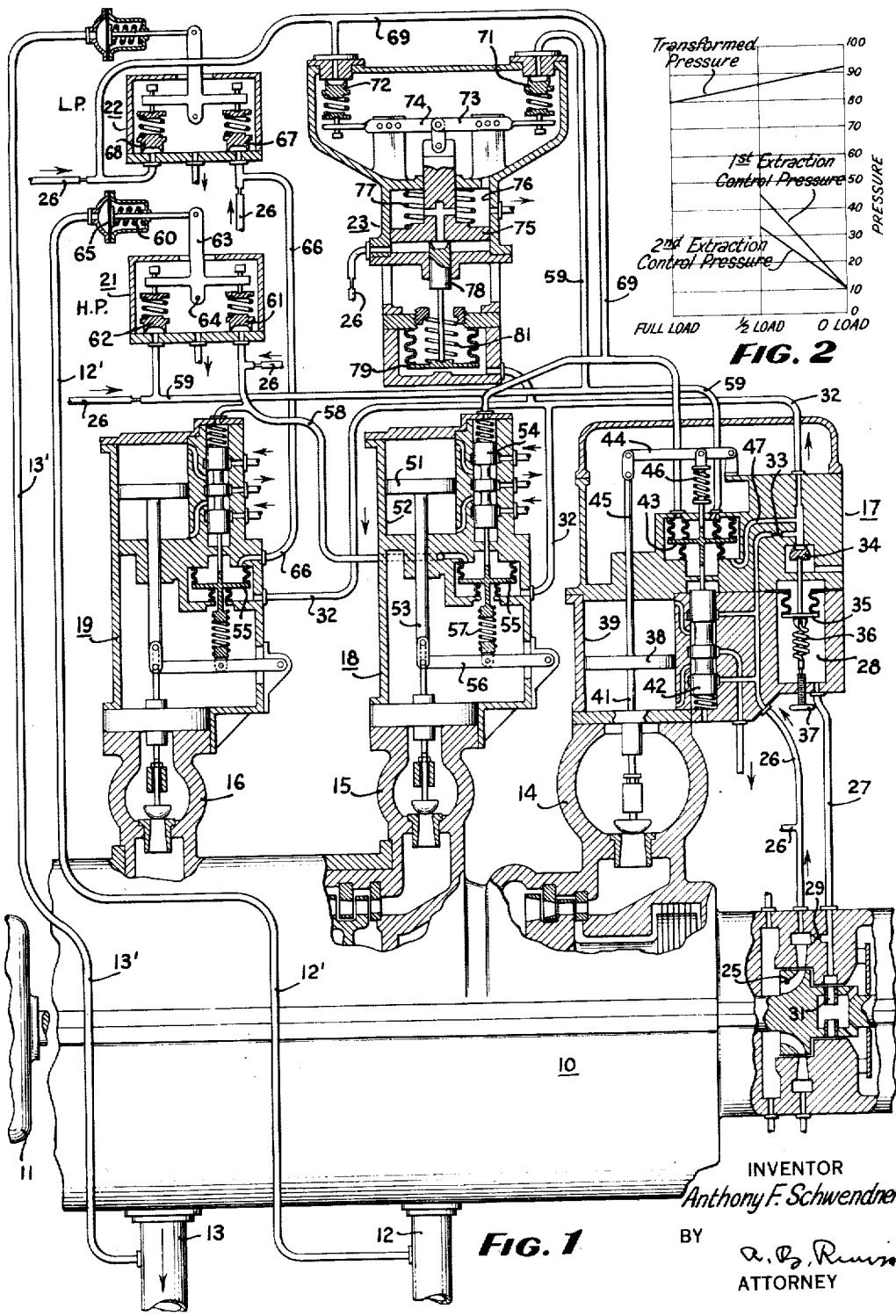

Aug. 21, 1945.　　A. F. SCHWENDNER　　2,383,219
CONTROL APPARATUS
Filed Feb. 21, 1944

INVENTOR
Anthony F. Schwendner
BY
ATTORNEY

Patented Aug. 21, 1945

2,383,219

UNITED STATES PATENT OFFICE 2,383,219

CONTROL APPARATUS

Anthony F. Schwendner, Ridley Park, Pa., assignor to Westinghouse Electric Corporation, East Pittsburgh, Pa., a corporation of Pennsylvania Application February 21, 1944, Serial No. 523,225

8 Claims. (Cl. 60—67)

My invention relates to control apparatus, more particularly to a control system for an extraction or bleeder turbine.

An extraction turbine is usually provided with a control system including a regulator or means for compensating or modifying the action of the speed-responsive governor to compensate for variation in the demand for extraction fluid. That is, as the demand for extraction fluid increases, the action of the governor is modified to increase the opening of the admission valve to supply the increased demand. Such compensation or modification of the governor action in effecting increased valve opening acts in opposition to the valve closing action of the governor in response to increase in speed. Such control operation may be effected satisfactorily as long as the load to be carried by the turbine can satisfy the extraction demand. When the load drops below that point or is lost completely, the extraction regulator, through the modifying action on the governor, causes complete or excessive opening of the admission valve. The governor can close the admission valve against the opening impulse or modifying action of the regulator only with a corresponding increase in speed. The speed to overcome such modifying action may rise above the setting of the automatic stop or emergency governor, which is undesirable.

It is an object of my invention to overcome the undesirable increase in speed occasioned by the compensating or modifying action.

In accordance with my invention, I provide a device for limiting the modifying action or compensation imposed on the governor, by means acting in response to a condition affected by the load on the turbine, preferably in response to the speed of the turbine. In the illustrated embodiment, I provide a fluid pressure which is varied in response to the extraction demand and which modifies the action of the governor. Upon increase in extraction demand, the fluid pressure is increased and causes the governor to increase the opening of the admission valve. In this case, I provide a pressure relief valve controlled in response to the speed or load of the turbine and operating to limit the compensating or modifying pressure as the speed of the turbine increases.

These and other objects are effected by my invention as will be apparent from the following description and claims taken in connection with the accompanying drawing, forming a part of this application, in which:

Fig. 1 is a diagrammatic view of a double extraction turbine and a governing system in accordance with my invention; and Fig. 2 is a graphic view showing the speed-responsive pressure imposed upon the governor for different loads, and also showing the limitations imposed on the compensating pressures for different loads.

Referring to the drawing in detail, I show a double extraction turbine 10, driving an electric generator partially shown at 11. The turbine is provided with extraction openings at two intermediate pressure stages, communicating with conduits 12 and 13 for extracting partially expanded motive fluid from the turbine. An admission or governing valve 14 controls the admission of high pressure motive fluid, such as steam, to the high pressure end of the blading. A valve 15 controls the flow of steam from the space from which steam is extracted to the conduit 12, to the succeeding stages of the blading in order to maintain the pressure at the extraction point. Similarly a valve 16 controls the flow of steam from the point at which steam is extracted to the conduit 13, to the following stages of the blading in order to maintain the pressure of the fluid extracted through the conduit 13. Instead of a single valve, a group of valves may be used, as is well known. From the final stages of the blading, the expended motive fluid is exhausted to a condenser (not shown).

The admission valve 14 is actuated by a governor 17, and the valves 15 and 16 are actuated by operating mechanisms 18 and 19, respectively. The mechanisms 18 and 19 are controlled, respectively, by a high pressure regulator 21 and a low pressure regulator 22. The compensating pressure-limiting device in accordance with the present invention is shown at 23.

The specific construction of the governor 21 of the illustrated embodiment is of the pressure transformer type. Other types of speed governor may be used, although I prefer a governor of the hydraulic type. Fluid pressure for operating the control system is derived from an impeller 25 mounted on the turbine shaft and is conveyed through a set of conduits designated 26 wherever they appear on the drawing, certain connecting portions of the conduits 26 being broken away for clarity of illustration. A primary governing fluid pressure is provided in an enclosed space comprising primarily a conduit 27 and a chamber 28. Fluid under pressure from the impeller 25 is admitted to this enclosed space through an orifice 29. The conduit 27 is connected to the discharge side of a second impeller 31 mounted on the turbine shaft. The impeller 31 develops a pressure which varies as the square of the speed of rotation of the shaft, and this pressure opposes the escape of fluid from the conduit 27 and is, therefore, imposed on the fluid in the enclosed space 27. This pressure is referred to as the primary governing fluid pressure.

The secondary or transformed governing fluid pressure is contained in an enclosed space comprising primarily a conduit 32. Fluid under pressure is admitted to this enclosed space through an orifice 33, and the escape of fluid therefrom is controlled by a pressure relief valve 34, which thereby controls the secondary pressure in the enclosed space. The valve 34 is controlled by a pressure-responsive element 35, which is subjected in valve closing direction to the primary governing pressure in the chamber 28, and which is biased in valve opening direction by a spring 36. A suitable mechanism is provided at 37 for changing the tension of the spring 36. A change in tension of the spring 36 changes the value of the secondary pressure in relation to the primary pressure and, therefore, changes the speed setting of the governor. The mechanism 37, therefore, constitutes a speed changer mechanism of the governor.

An increase in primary governing pressure imposed on the pressure-responsive element 35 causes the latter to increase the force imposed on the valve 34 in closing direction, thereby increasing the secondary governing pressure. The area of the pressure-responsive element 35 is greater than that of the valve 34, so that for a given change in primary pressure, there is a substantially greater change in secondary pressure. The operation of the pressure transformer type of governor is more fully explained in Patent No. 1,793,514.

The governor 17 further includes an operating piston 38 disposed in a cylinder 39 and connected to the valve 14 by a rod 41. The governor further includes a relay valve 42 which controls the communication of the upper and lower ends of the cylinder 39 with pressure supply and exhaust ports in a manner clearly shown on the drawing and well known in the art. The relay valve 42 is actuated by a pressure-responsive element 43. The relay valve 42 is shown as rigidly connected to the pressure-responsive element 43, but optionally it may be actuated by fluid pressure to follow the pressure-responsive element 43 in a manner well known in the art.

The governor 17 further includes a follow-up lever 44 which is fulcrumed at its right-hand end and pivotally connected to the piston stem 45 at its left-hand end. Intermediate its ends, it is connected to the pressure-responsive element 43 through a compression spring 46.

The pressure-responsive element 43 is subjected on its under side to the secondary governing pressure communicated through a passage 47. On its upper side, it is subjected to compensating fluid pressures as will be described later.

The operating mechanism 18 for the valve 15 includes a piston 51 operating in a cylinder 52 and connected to the valve 15 by a rod 53. A relay valve 54, actuated by a pressure-responsive element 55, controls the supply and exhaust of fluid to the upper and lower ends of the cylinder 52 in a manner which will be apparent from the drawing and which is well understood in the art. A follow-up lever 56, fulcrumed at its right-hand end and connected at its left-hand end to the rod 53, is connected to the pressure-responsive element 55 through a tension spring 57.

The pressure-responsive element 55 has imposed on its lower side the secondary pressure communicated through the conduit 32. On its upper side, it is subjected to the regulating pressure controlled by the high pressure regulator 21 and communicated through a conduit 58. Fluid under pressure is admitted to the conduit 58 from the conduit 26 through an orifice. The regulator 21 also controls a compensating fluid pressure communicated through a conduit 59 and imposed on the upper side of the pressure-responsive element 43. The regulator 21 comprises spring-biased pressure relief valves 61 and 62 for controlling the pressures in the conduits 58 and 59, respectively, by controlling the discharge of fluid therefrom. The regluator 21 further includes a lever 63, which is adapted to tilt about its fulcrum 64 to increase the force of one spring while decreasing the force of the other spring. The lever 63 is actuated by a pressure-responsive element 65 in response to the pressure in the conduit 12 communicated through the conduit 12' and imposed on the element 65 in opposition to the force of a spring 60.

The operating mechanism 19 may be the same as the mechanism 18. Its pressure-responsive element 55 is subjected on the lower side to the secondary governing pressure and on its upper side to the regulating pressure transmitted through a conduit 66 and controlled by the low pressure regulator 22. The latter is similar to the regulator 21, including a spring-biased pressure relief valve 67 for controlling the pressure in the conduit 66, and a second pressure relief valve 68 for controlling a compensating pressure in a conduit 69, which pressure is also imposed on the upper side of the pressure-responsive element 43. The low pressure regulator 22 is controlled by the pressure in the conduit 13 communicated through a conduit 13'. The compensating pressure in the conduit 69 may also be imposed on the upper side of the relay 54 and thereby on the pressure-responsive element 55 of the mechanism 18 to compensate for variations in demand in the conduit 13, and the regulating pressure in the conduit 58 may be imposed on the upper side of the relay 54 and thereby on the element 55 of the mechanism 19 to compensate for variations in demand in the conduit 12. The present invention is equally applicable whether or not this additional compensation is provided.

The compensating pressure-limiting device 23, to which the present invention particularly relates, includes a pressure relief valve 71 communicating with the conduit 59, and a second pressure relief valve 72 communicating with the conduit 69. The valves 71 and 72 are provided with compression springs which are adapted to be held in compression by levers 73 and 74 connected to an operating piston 75. The latter is disposed in a cylinder 76 and is biased downwardly by a spring 77. A restricted flow of fluid under pressure is admitted to the lower end of the cylinder 76. The piston 75 is formed with a discharge port controlled by a valve 78, the latter being actuated by a pressure-responsive element 79 which is biased upwardly against the force of a spring 81 by the secondary governing pressure imposed on its lower side.

The turbine is provided with a conventional auto-stop or emergency overspeed governor (not shown) and a conventional throttle valve (not shown) controlled thereby. At a speed, such as eleven per cent above the normal or rated speed, such governor trips and causes the throttle valve to close to shut off the admission of motive fluid to the turbine. Such action requires manual resetting before the flow of motive fluid to the turbine can be restored.

*Operation*

The valves 14, 15 and 16 are moved in closing direction upon increase in speed and in opening direction upon decrease in speed. This is effected as follows: An increase in speed results in an increase in primary governing pressure, with consequent greater increase in the second governing pressure. The pressure-responsive element 43 of the governor is moved upwardly by such increased pressure, effecting increased compression of the spring 46. The relay 42 is moved upwardly to admit fluid pressure to the upper end of the cylinder 39 and to exhaust fluid to drain from the lower end of the cylinder. The piston 38 moves the valve 14 downwardly in closing direction. The lever 44 is also moved downwardly and, through the spring 46, restores the pressure-responsive element 43 and the relay valve 42 to the normal or cut-off position as the piston 38 completes the extent of movement called for by the change in speed. The operation of the mechanisms 18 and 19 is substantially the same, except that the tension spring 57 is lengthened whereas the compression spring 46 of the governor is shortened.

Upon decrease in speed, the primary governing pressure is reduced, effecting a greater decrease in the secondary pressure. This results in downward movement of the pressure-responsive element 43 under force of the spring 46, whose compression is reduced by the lower secondary pressure. The relay valve 42 moves downwardly to admit fluid under pressure to the lower end of the cylinder 39 and to exhaust fluid from the upper end of the cylinder to drain. The piston 38 moves upwardly to increase the valve opening. The lever 44 also moves upwardly and, through the spring 46, restores the pressure-responsive element and the relay valve 42 to cut-off position as the required movement is completed. The operation of the mechanisms 18 and 19 is again the same with the exception that the tension springs are shortened.

When the generator 11 is connected with other generators through an electric power line, as is common practice, the speed of the turbine 10 and the generator 11 is controlled by the group of generators so connected and is usually kept quite constant. In such case, the load on the turbine 10 is varied by adjustment of the speed changer 37. For example, if the tension of the spring 36 is increased, the secondary pressure is decreased and causes movement of the valves to increase the steam flow. If the tension is reduced, the secondary pressure is increased and the steam flow decreased. Thus, the load is changed without change in speed or primary pressure. The secondary pressure, therefore, varies both with change in speed and with manual adjustment to vary the load. It is a function of and determines the load to be carried by the turbine.

An increase in demand for partially-expanded steam in the conduit 12 is represented by a decrease in pressure thereof, which is communicated through the conduit 12' to the pressure-responsive element 65 of the regulator 21. As a result, the spring 60 moves the lever 63 in counterclockwise direction, thereby decreasing the spring force of the relief valve 61 and increasing the spring force of the relief valve 62. The valve 61 decreases the regulating pressure communicated through the conduit 58 to the upper side of the pressure-responsive element 55 of the mechanism 18, causing the latter to be moved upwardly. Such upward movement effects movement of the valve 15 in closing direction in the same manner as described above. Decreased flow to the remaining stages of the turbine diverts more steam into the conduit 12. The valve 62 increases the compensating pressure communicated through the conduit 59 to the pressure-responsive element 43, effecting downward movement of the pressure-responsive element with consequent opening movement of the admission valve 14. The increased admission of high-pressure steam provides more steam for the conduit 12 and also provides more generation of power in the high-pressure end of the turbine to compensate for the decreased power generated in the lower pressure stages, occasioned by the closing movement of the valve 15.

A decrease in demand for steam in the conduit 12 is reflected by an increase in pressure which is communicated through the conduit 12' and acts on the pressure-responsive element 65 to tilt the lever 63 in clockwise direction. The increased regulating pressure communicated through the conduit 58 to the upper side of the pressure-responsive element 55 effects opening movement of the valve 15 to permit greater flow of steam to the succeeding stages. The decreased compensating pressure communicated through the conduit 59 to the upper side of the pressure-responsive element 43 results in closing movement of the admission valve 14. Thus, less steam is diverted to the conduit 12 and the increased flow through the lower pressure stages compensates for decreased power generation in the higher pressure stages.

Upon change in pressure in the steam in conduit 13 occasioned by change in demand therefor, the regulator 22 varies the regulating pressure communicated through the conduit 66 to the pressure-responsive element 55 of the operating mechanism 19, and also the compensating pressure communicated through the conduit 69 to the pressure-responsive element 43. The operation is the same as that described in connection with the valve 15, so that further description is not necessary.

The operation so far described is old and well known in the art.

In a turbine in which the maximum extraction demand is high in relation to the power developed by the turbine, the compensating pressures will have a greater effect on the governor than the secondary governing pressure. Considering one example, it may be assumed that the secondary governing pressure, for one setting of the speed changer mechanism, varies from 80 pounds to 92 pounds per square inch from full load to no load, which is effected upon increase in speed of four per cent. Assume also that the compensating pressure communicated from the high-pressure regulator 21 through the conduit 59 varies from 10 pounds to 46 pounds per square inch upon increase from zero to maximum demand for steam in the conduit 12. Assume further that the compensating pressure transmitted from the low-pressure regulator 22 through the conduit 69 and imposed on the upper side of the pressure-responsive element 43 varies from 10 pounds to 34 pounds per square inch upon increase from zero to maximum demand for steam in the conduit 13. It is assumed that the area on which each of the pressures acts on the pressure-responsive element 43 of this embodiment is the same. In this example, the governor moves the admission valve from the full open to the full closed position upon change in the pressure differential acting on the pressure-responsive element 43 from 0 to 72 pounds. The zero differential is effected by the minimum secondary governing pressure of 80 pounds opposed by maximum compensating pressures of 46 and 34 pounds, respectively, and the maximum differential of 72 pounds is effected by maximum secondary governing pressure of 92 pounds opposed by minimum compensating pressures of 10 pounds each. It will thus be noted that the effect of variation in the compensating pressures is greater than that of the variation in the secondary governing pressure through the normal governing range, which in this case is considered as 4 per cent. In the example, it effects but 12 pounds or one-sixth of the pressure variation required to move the governor through its travel.

A disadvantage of this arrangement is that, in the event of loss of load on the turbine, as when the connection between the generator 11 and the electrical line is opened, an excessive increase in speed is required to develop a secondary pressure which will act on the element 43 and overcome the compensating pressures to effect complete closing of the admission valve 14. For example, with maximum demand at both extraction points, the compensating pressures will be 46 pounds and 34 pounds per square inch, or a total of 80 pounds. This means that the secondary governing pressure must increase to 152 pounds before the admission valve 14 is closed. Such pressure corresponds to a speed of the turbine well above the speed at which the emergency or auto-stop governor trips and shuts the throttle valve to the turbine.

According to the present invention, however, the compensating pressures are decreased to their minimum values before an excessive speed is attained, so that the secondary governing pressure may be able to effect closing of the admission valve. This is accomplished by the compensating pressure limiting device 23.

As the secondary pressure exceeds a predetermined value, the pressure-responsive element 79 moves the valve 78 upwardly to cut off escape of fluid through the opening in the piston 75. The restricted flow of fluid into the lower end of the cylinder 76 raises the piston 75, thereby tilting the levers 73 and 74 in the direction to lessen the compression of the springs of the relief valves. Thus, the relief valves 71 and 72 are caused to decrease the pressures at which they open. When the pressure setting of the valve 71 is less than that of the valve 62, it opens to permit escape of fluid from the conduit 59 and thereby reduces and limits the compensating pressure in said conduit. Likewise, when the setting of the valve 72 is reduced below that of the valve 68, it reduces and controls the compensating pressure in the conduit 69.

When partially expanded steam is extracted at two points, as in the illustrated embodiment, I prefer to adjust the limiting device 23 to reduce both of the compensating pressures from maximum to minimum upon decrease in load from ½ load to no load, or upon an increase in secondary pressure from its mean value to its maximum value, as graphically illustrated in Fig. 2. In the example given, therefore, the limiting device 23 operates in response to increase in secondary governing pressure from 86 pounds to 92 pounds to adjust the valves 71 and 72 to reduce the compensating pressure in the conduit 59 from the maximum of 46 pounds to the minimum of 10 pounds, and to reduce the compensating pressure in the conduit 69 from the maximum of 34 pounds to the minimum of 10 pounds. Thus, in the event of loss of load on the turbine, by the time that the speed has reached the upper limit of the governing range, at which time the governor calls for closed position of the admission valve so far as load is concerned, the compensating effects have been removed from the governor and it is then effective to close the admission valve to prevent further increase in speed. Thus, the admission valve is closed well before the speed increases to the point at which the emergency governor trips and such tripping is thereby avoided.

Assume, now, that the turbine and generator unit is operating by itself and not with other turbine generator units. In the event that the extraction demands become more than the load on the turbine can satisfy, the speed will rise since, in the present embodiment, the compensating pressures are not limited exactly in accordance with the load on the turbine. For example, assume maximum extraction demand at each extraction opening and that the load drops to ¼ of full load. At the ¼ load point, the compensating pressures are reduced only to their mean values, so that the admission valve is opened beyond the quarter load point. The result is that the speed begins to increase, with consequent increase in secondary governing pressure, whereupon the pressure-limiting device reduces the compensating pressures until an equilibrium is reached at which the opening of the admission valves is limited to correspond to the load. This equilibrium takes place before the upper limit of the governing range is reached.

Assume now that the turbine and generator unit are connected on an electric line with other generators. In this case, the limiting device imposes some limitation on the compensating pressures, as will be clear from the above explanation and from Fig. 2, although the present embodiment does not, in this case, fully prevent over-extraction.

When there is only one extraction opening, I prefer to provide a pressure-limiting device that progressively reduces the compensating pressure from maximum to minimum value upon increase in the secondary governing pressure from a value slightly above the minimum or full load value to a value slightly above the maximum or no load value. The operation of such a control is the same except that it is possible more closely to limit the compensating pressure to a value corresponding to an extraction demand that can be satisfied by the load to be carried by the turbine. In this case, the limiting device prevents any substantial over-extraction, or extraction more than allowed by the load carried on the unit.

While I prefer, as in the examples given above, to reduce the compensating pressures substantially within the governing speed range, it is to be understood that the invention is not so limited but that the reduction in the compensating pressures may be effected through a speed range between the governing range and the speed at which the emergency governor trips, or it may partially overlap the governing speed range.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with an elastic-fluid turbine having an admission valve and an extraction opening, of a control system for said admission valve comprising governing means responsive to the speed of the turbine for controlling said admission valve, means for modifying the action of said governing means in response to variation in the extraction demand, and means operable in response to change in load on the turbine for limiting the control of the last-mentioned means and effecting modifying action corresponding to load on the turbine.

2. The combination with an elastic-fluid turbine having an admission valve and an extraction opening, of a control system for said admission valve comprising a governor mechanism for controlling said admission valve in response to the speed of the turbine and having speed changer mechanism for changing the speed setting of the governor mechanism, means for modifying the action of said governor mechanism in response to variation in the extraction demand, and means operable in response to change in an operating condition of said governor mechanism that varies with the speed of the turbine and with the adjustment of said speed changer mechansim for limiting the control of said modifying means and effecting modifying action corresponding to said variable operating condition.

3. The combination with an elastic-fluid turbine having an admission valve and an extraction opening, of a control system for said admission valve comprising governor mechanism for controlling said admission valve, said governor mechanism including means providing a primary fluid pressure varying as a function of the speed of the turbine, means providing a secondary fluid pressure varying in response to and as a function of said primary fluid pressure and speed changer mechanism for adjusting the last-mentioned means to vary the relation of said secondary to said primary pressure to vary the speed setting of the governor mechanism, means for actuating said admission valve in response to said secondary fluid pressure, means providing a compensating fluid pressure and for increasing and decreasing the same in response to increase and decrease, respectively, in the extraction demand, means for imposing said compensating fluid pressure on said valve actuating means in the direction to increase and decrease the opening of said admission valve upon increase and decrease, respectively, in said compensating fluid pressure, and means operable in response to variation in said secondary fluid pressure for limiting the value of said compensating fluid pressure.

4. The combination with an elastic-fluid turbine having an admission valve and an extraction opening, of a control system for said admission valve comprising governing means responsive to the speed of the turbine for controlling said admission valve, means for modifying the action of said governing means to increase the opening of said admission valve in response to increase in the demand for extraction fluid, and means for limiting said modifying action of the regulator in response to increase in speed.

5. The combination with an elastic-fluid turbine having an admission valve, an extraction opening between two successive stages thereof for extracting partially expanded motive fluid, and a valve for controlling the flow of motive fluid to the stages beyond the extraction opening, of a control system for said valves comprising, of a control system for increasing and decreasing the opening of said admission valve upon decrease and increase, respectively, in the speed of the turbine, means responsive to increase and decrease in demand for partially expanded fluid for decreasing and increasing the opening of said second-mentioned valve and for modifying the action of said governing means to increase and decrease, respectively, the opening of said admission valve, and means responsive to increase in speed of the turbine for limiting and superseding the action of said modifying means in such way as to progressively limit the opening of said admission valve upon increase in speed.

6. The combination with an elastic-fluid turbine having an admission valve and adapted to supply a demand for fluid that has passed through one or more stages of the turbine, of a control system for said admission valve comprising governing means for controlling said admission valve in response to the speed of the turbine to maintain the speed substantially at a normal value, means providing a fluid pressure and for increasing and decreasing the same in response to increase and decrease, respectively, in said demand for fluid from the turbine, means for imposing said fluid pressure on said governing means in the direction to increase and decrease the opening of said admission valve upon increase and decrease, respectively, in said fluid pressure, and a pressure relief valve operable in response to increase in load on the turbine to reduce said fluid pressure.

7. The combination with an elastic-fluid turbine having an admission valve and adapted to supply a demand for fluid that has passed through one or more stages of the turbine, of a control system for said admission valve comprising governing means for controlling said admission valve and adapted to increase and decrease the opening of said admission valve in response to decrease and increase, respectively, in the speed of the turbine, means for modifying the action of said governor in response to said demand for fluid comprising means providing an enclosed space, means providing a restricted flow of fluid under pressure into said space, a pressure relief valve controlling discharge of fluid from said space and operable to increase and decrease the pressure of the fluid in said space in response to increase and decrease, respectively, in said demand for fluid, means for imposing the fluid pressure in said enclosed space on said governing means in the direction to increase and decrease the opening of said admission valve upon increase and decrease, respectively, in said fluid pressure, and a second pressure relief valve also adapted to permit discharge of fluid from said enclosed space and operable to reduce the pressure in said enclosed space in response to change in load on the turbine.

8. The combination wtih an elastic-fluid turbine having an admission valve and first and second extraction openings, of a control system comprising a governor mechanism for controlling said admission valve, means for modifying the action of said governor mechanism in response to variation in extraction demand at said first extraction opening, means for modifying the action of said governor mechanism in response to variation in extraction demand at said second extraction opening, and means operable in response to change in an operating condition of said governor mechanism which is a function of the load on the turbine for limiting the control of both of said modifying means and effective upon decrease in load from one-half load to no load to progressively limit the modifying action of each of said means from that corresponding to maximum extraction demand to that corresponding to zero extraction demand.

ANTHONY F. SCHWENDNER.

DISCLAIMER 2,383,219.—*Anthony F. Schwendner*, Ridley Park, Pa. CONTROL APPARATUS. Patent dated Aug. 21, 1945. Disclaimer filed Nov. 20, 1946, by the assignee, *Westinghouse Electric Corporation*.

Hereby enters this disclaimer to claims 1, 4, and 5 of said patent.

[*Official Gazette December 24, 1946.*]

comprising a governor mechanism for controlling said admission valve, means for modifying the action of said governor mechanism in response to variation in extraction demand at said first extraction opening, means for modifying the action of said governor mechanism in response to variation in extraction demand at said second extraction opening, and means operable in response to change in an operating condition of said governor mechanism which is a function of the load on the turbine for limiting the control of both of said modifying means and effective upon decrease in load from one-half load to no load to progressively limit the modifying action of each of said means from that corresponding to maximum extraction demand to that corresponding to zero extraction demand.

ANTHONY F. SCHWENDNER.

DISCLAIMER 2,383,219.—*Anthony F. Schwendner*, Ridley Park, Pa. CONTROL APPARATUS. Patent dated Aug. 21, 1945. Disclaimer filed Nov. 20, 1946, by the assignee, *Westinghouse Electric Corporation*.

Hereby enters this disclaimer to claims 1, 4, and 5 of said patent.

[*Official Gazette December 24, 1946.*]